(12) United States Patent
Pastoor

(10) Patent No.: US 9,723,809 B2
(45) Date of Patent: Aug. 8, 2017

(54) VEHICLE FOR DISPLACING FEED

(71) Applicant: LELY PATENT N.V., Maassluis (NL)

(72) Inventor: Jan Lambertus Pastoor, Rijswijk (NL)

(73) Assignee: LELY PATENT N.V., Maassluis (NL)

( * ) Notice: Subject to any disclaimer, the term of this patent is extended or adjusted under 35 U.S.C. 154(b) by 387 days.

(21) Appl. No.: 14/147,703

(22) Filed: Jan. 6, 2014

(65) Prior Publication Data

US 2014/0117110 A1    May 1, 2014

Related U.S. Application Data

(63) Continuation of application No. PCT/EP2012/061680, filed on Jun. 19, 2012.

(30) Foreign Application Priority Data

Jul. 6, 2011   (NL) ..................... 1038927

(51) Int. Cl.
| | |
|---|---|
| *A01C 3/06* | (2006.01) |
| *A01K 5/00* | (2006.01) |
| *A01K 1/10* | (2006.01) |
| *A01K 5/02* | (2006.01) |

(52) U.S. Cl.
CPC ............... *A01K 5/00* (2013.01); *A01K 1/105* (2013.01); *A01K 5/0266* (2013.01)

(58) Field of Classification Search
CPC ......... A01K 5/00; A01K 5/0266; A01K 1/105
USPC ................ 239/650, 657, 670, 679, 681, 689
See application file for complete search history.

(56) References Cited

U.S. PATENT DOCUMENTS

| | | | | |
|---|---|---|---|---|
| 2009/0069968 A1* | 3/2009 | Van Den Berg | ..... | A01K 5/0266 701/23 |
| 2010/0230183 A1* | 9/2010 | Van Den Berg | ..... | A01K 5/0266 180/6.48 |

FOREIGN PATENT DOCUMENTS

| | | |
|---|---|---|
| DE | 29800152 U1 | 5/1998 |
| EP | 1779722 A1 | 5/2007 |
| FR | 2862489 A1 | 5/2005 |
| WO | 2007120036 A1 | 10/2007 |
| WO | 2009070007 A1 | 6/2009 |

OTHER PUBLICATIONS

The International Search Report for PCT/EP2012/061680 issued on Aug. 14, 2012.
The International Preliminary Report on Patentability for PCT/EP2012/061680 issued on Jan. 7, 2014.

* cited by examiner

*Primary Examiner* — Jason Boeckmann
(74) *Attorney, Agent, or Firm* — Hoyng Rokh Monegier LLP; Ramin Amirsehhi; David P. Owen

(57) ABSTRACT

An autonomous and self-propelled vehicle for laterally displacing feed, having a frame and a housing, the housing including a rotatable feed-displacement device, at least a bottom section of the feed-displacement device being rotationally symmetrical about a cylinder axis, the cylinder axis being at an angle to the vertical direction in such a manner that a part of the feed-displacement device which, viewed in the direction of travel, is situated at the front is arranged closer to the ground than a part of the feed-displacement device which, viewed in the direction of travel, is situated at the rear.

12 Claims, 3 Drawing Sheets

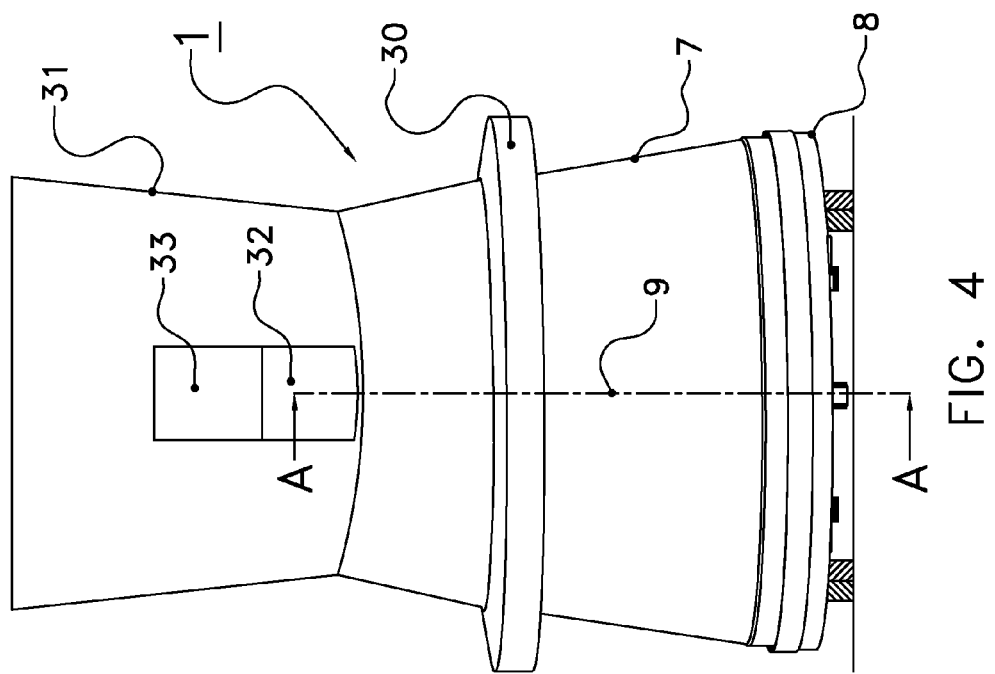
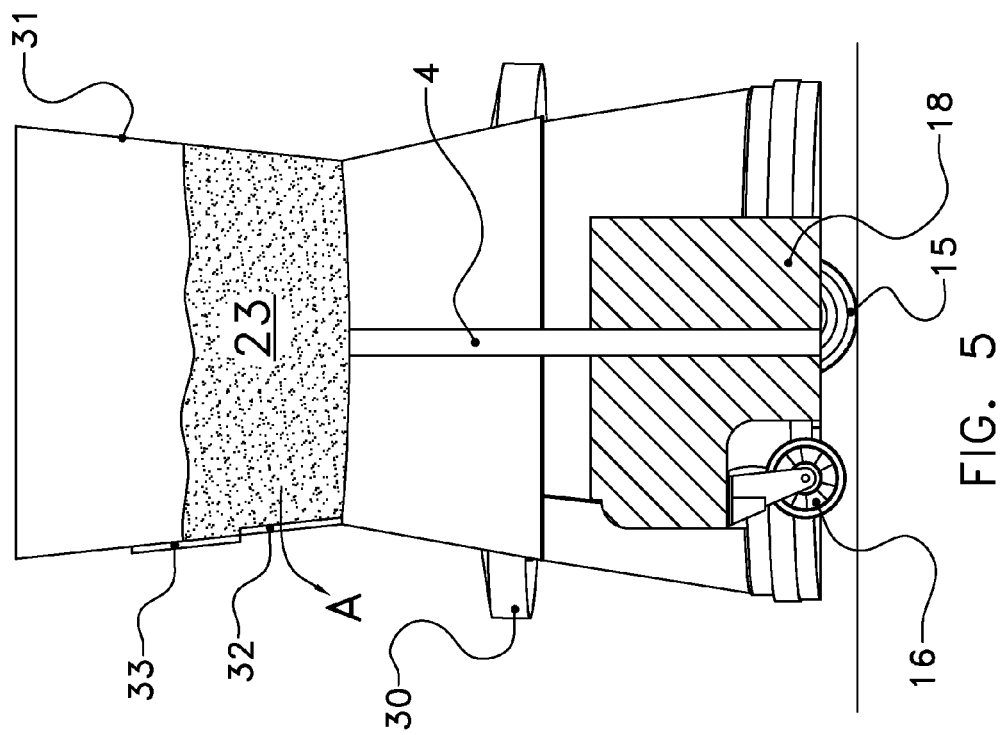

VEHICLE FOR DISPLACING FEED

CROSS REFERENCE TO RELATED APPLICATIONS

This application is a continuation of PCT application number PCT/EP2012/061680 filed on 19 Jun. 2012, which claims priority from Netherlands application number 1038927 filed on 6 Jul. 2011. Both applications are hereby incorporated by reference in their entireties.

BACKGROUND OF THE INVENTION

1. Field of the Invention

The invention relates to an autonomous and self-propelled vehicle comprising feed-displacement means for laterally displacing feed.

2. Description of the Related Art

Such a vehicle is known from WO 2009/070007 A1, hereby incorporated by reference in its entirety. This vehicle comprises a frame to which feed-displacement means are fitted in the form of a freely rotating circular element, the outer periphery of which forms the outer periphery of the unmanned vehicle. The freely rotating element is driven by frictional contact with the feed and/or pressure of the feed. As a result of the rotation of the element, the feed is displaced laterally with respect to the direction of travel of the vehicle. This vehicle is used in animal housing units in which, for example, cows can reach the feed on the ground through a wall in order to eat. The vehicle then ensures that the feed comes to lie near the wall and remains within reach of the cows.

WO 2009/070007 A1 discloses one diagrammatic embodiment of the freely rotating circular element. FIG. 1 of WO 2009/070007 shows a freely rotating element which has a shape and a vertical axis which is rendered as a dash-dotted line without a reference numeral, in which the end faces of the shape are not perpendicular to the axis. The illustrated embodiment is not able to work properly in practice.

Rotation of the element can be effected in two ways. The element can be rotated in its entirety about the axis, in which case the orientation of the element co-rotates. This means that the lowest point co-rotates, and may, for example, also come to lie on the rear side of the vehicle. However, this is not desirable as such a changing orientation makes it likely that feed may come to lie under the vehicle during a large part of the rotation, due to the difference in height.

In another rotation option, the element is rotated about the cylinder axis, in which case the orientation of the element, i.e. the position of the lowest point, as shown in FIG. 1 of WO 2009/070007 A1, does not change. A drawback thereof is that the freely rotating element is twisted upon rotation about the cylinder axis. In order to allow this twisting movement without a relatively high resistance, the freely rotating element will have to be designed to be flexible, which has an adverse effect on the pushing function and thus on the feed-displacing function of the element.

In addition, two vehicles are known in which the feed-displacement means are conical, with the cone shapes tapering either towards the top or towards the bottom. A drawback of the upwardly tapering feed-displacement means is that when they are driven by friction with the ground, a relatively large amount of resistance is produced when the vehicle takes bends. A drawback of the downwardly tapering feed-displacement means is that the wheel base and thus the stability of the vehicle is limited.

BRIEF SUMMARY OF THE INVENTION

It is an object of the invention to provide a vehicle having an improved feed-displacement function. It is an object to provide a vehicle of the type mentioned in the preamble with feed-displacement means which are simple to produce. It is a further object to provide a vehicle of the type mentioned in the preamble which is reliably stable.

At least one of these objects is achieved by providing an autonomous and self-propelled vehicle for substantially laterally displacing feed situated on a ground, comprising a frame and a housing arranged on the frame, wherein the housing comprises feed-displacement device for displacing feed substantially laterally with respect to a direction of travel, wherein the feed-displacement device is rotatable with respect to the frame, and wherein the outer periphery of the housing forms the outer periphery of the vehicle; wherein at least a bottom section of the feed-displacement device has a cylindrical shape having a cylinder axis, wherein the feed-displacement device is rotationally symmetrical about the cylinder axis, wherein the feed-displacement device is rotatable about the cylinder axis, and wherein the cylinder axis is at an angle to a vertical direction in such a manner that a part of the feed-displacement device which, viewed in the direction of travel, is situated at the front is arranged closer to the floor than a part of the feed-displacement device which, viewed in the direction of travel, is situated at the rear.

An advantage of this vehicle is the fact that the feed-displacement means have a cylindrical shape which is rotationally symmetrical, as a result of which the feed-displacement means do not twist when rotating about the cylinder axis and can therefore be of a stiffer design, which improves the effectiveness of the feed-displacement function.

In an embodiment, the housing has an upper section which tapers towards the top.

In an embodiment, the housing is rotationally symmetrical.

In an embodiment, the upper section is conical.

In another embodiment, at least a bottom edge of the bottom section of the feed-displacement device is made of rubber.

In a further embodiment, the cylindrical part of the feed-displacement device is composed of one or more rectangular parts.

In an embodiment, the angle between the cylinder axis and the vertical direction is adjustable. The vertical direction as disclosed herein refers to a vertical line or virtual axis.

In a further embodiment, the angle between the cylinder axis and the vertical direction is between 1 and 10 degrees.

In an embodiment, an angle between a vertical projection of the cylinder axis and the direction of travel is unequal to zero.

In a further embodiment, the feed-displacement device is arranged freely rotatably for frictional drive with the ground and/or the feed.

In an embodiment, the vehicle is provided with two wheels which can be driven separately by separate driving devices; a distance-determining device for determining the distance of the vehicle to a wall section; and a control unit for controlling and displacing the vehicle in the direction of travel; wherein the control unit is programmed in such a way that the vehicle, during operation, remains at a distance to the wall section which is determined by the distance-determining device, which distance is greater than or equal to a preset minimum distance to the wall section.

In a further embodiment, the vehicle is provided with a rechargeable power supply.

In an embodiment, the vehicle is provided with a storage container for containing feed, and with a discharge device for discharging feed in the direction of the ground.

In an embodiment, the discharge device is designed to discharge the feed in the direction of the ground section situated in front of the vehicle, preferably by means of a dispensing opening which is, viewed in the direction of travel, situated at the front.

In addition, a cylindrical shape offers most space for wheels and this makes it possible to choose a relatively large wheel base, which in turn means reliable stability of the vehicle.

In an embodiment, the cylindrical part of the feed-displacement means is composed of one or more rectangular parts. An advantage of the vehicle according to the invention compared to, for example, conical feed-displacement means is that the cylindrical part can be composed of originally rectangular parts, which facilitates manufacturing and assembly compared to the prior-art cylindrical elements. Conical feed-displacement means are, for example, composed of banana-shaped parts. The rectangular parts can then be made more simply by means of straight cuts or, for example, by punching.

In an embodiment, the angle between the cylinder axis and the vertical direction is adjustable.

An advantage of the vehicle according to the invention compared to the vehicle from WO 2009/070007 A1 is the fact that the angle which the cylinder axis makes with the vertical direction corresponds to the angle which the feed-displacement means make with the horizontal, thus facilitating the adjustment thereof.

The angle between the cylinder axis and the vertical is preferably between 1 and 10 degrees, more preferably between 1 and 5 degrees and most preferably the angle is 3 degrees (rounded off). With the average size of the vehicle, that is to say of the order of 1 meter in diameter, an inclination will thus be obtained which can be used for most types of feed.

As a result of the cylindrical shape of the bottom section of the feed-displacement means and the inclined position thereof with respect to the vertical, the front part of the cylindrical part will extend slightly inwards in the direction of the ground. This reduces the resistance when the vehicle takes bends if the feed-displacement means are driven by means of frictional contact with the ground. Also, and quite significantly, the feed-displacement means will be able to bend more easily, as they already point slightly backwards due to the slight angle with respect to the ground, in contrast with the prior-art feed-displacement means which point conically outwards. The present invention thus produces an improved feed-sweeping function.

In an embodiment, the housing has an upper section which narrows towards the top, in particular tapers towards the top. As a result thereof, the vehicle will readily be able to drive on or turn when it collides with an object, in particular with a housing which is at an angle to the vertical. Preferably, the housing is rotationally symmetrical, and more preferably, the upper section is conical. Feed which falls on this section of the housing will therefore more readily slide off in the direction of the ground and not remain on the vehicle. This applies in any case in embodiments where the vehicle is provided with a storage container for containing feed and with a discharge device for discharging feed in the direction of the ground. The discharge device can be arranged on top of the vehicle and can discharge the feed by means of the upper section of the housing.

Preferably, the discharge device is designed to discharge the feed in the direction of the ground section which is situated in front of the vehicle, preferably by means of a dispensing opening which is, viewed in direction of travel, situated at the front of the vehicle, so that the feed is mixed in with the feed which is already present on the floor and is then displaced laterally by the vehicle in the direction of animals for which the feed is intended. In other words, the discharge device has a discharge opening which, viewed in the direction of travel, is situated at the front of the storage container.

Placing the storage container on top of the vehicle is disadvantageous for the stability of the vehicle, in particular if the storage container is filled with feed. Preferably, the housing is therefore also provided with an upper part which narrows towards the top and preferably tapers/is conical towards the top, and a lower cylindrical part in order to thus be able to provide as large a wheel base as possible in order to render the vehicle as stable as possible.

In an embodiment, at least a bottom edge of the bottom section of the feed-displacement means is made of rubber. This has the advantage that there is sufficient friction with the ground and/or the feed in order to drive the feed-displacement means. Another advantage is the fact that contact between feed-displacement means and the ground and/or feed does not result in significant damage as the rubber is deformable.

In an embodiment, the plane which is defined by the cylinder axis and the vertical makes an angle with a plane which is defined by the vertical and the direction of travel. This ensures that the direction of rotation of the feed-displacement means is the same, at least in principle, when the vehicle moves in the direction of travel.

The angle between the vertical projection of the cylinder axis and the direction of travel is preferably an acute angle. It should be noted that here, as in the entire application unless the context indicates otherwise, the "direction of travel" means the direction straight ahead. This direction thus corresponds to a longitudinal axis of the vehicle. Said angle is preferably between 5 and 20 degrees.

In embodiments, the feed-displacement means may be arranged freely rotatably for frictional drive with the ground and/or the feed. Such a construction without motor and the like is obviously very simple and reliable. Alternatively, drive means for the feed-displacement means can be provided. The actuation thereof may depend on the amount of feed and thus on the possibility to drive the feed-displacement means by means of frictional contact between feed-displacement means and feed. Thus, in an embodiment, it may be provided that the drive means for the feed-displacement means are only actuated if the amount of feed for contact with the feed-displacement means is below a predetermined level. This therefore renders the operation of the feed-displacement means even more reliable and makes it possible, for example, to choose a drive direction in the opposite direction to the "natural" direction with only friction.

In an embodiment, the vehicle is provided with:
two wheels which can be driven separately by separate drive means;
a distance-determining means for determining the distance of the vehicle to a wall section;

a control unit for controlling and displacing the vehicle in the direction of travel;

wherein the control unit is programmed in such a way that the vehicle, during operation, remains at a distance to the wall section which is determined by the distance-determining means, which distance is greater than or equal to a preset minimum distance to the wall section.

This ensures that the vehicle can autonomously displace feed substantially at right angles to the direction of travel without a separate guide, despite the fact that the feed exerts an (unpredicted) reactive force on the vehicle.

In an embodiment, the two separate drive means for the wheels are replaced by one drive means with a drive power-distributing means, such as a transmission.

In an embodiment, the vehicle is provided with a rechargeable power supply.

BRIEF DESCRIPTION OF THE DRAWINGS

The features and advantages of the invention will be appreciated upon reference to the following drawings, in which:

FIG. 4 shows a diagrammatic rear view of a vehicle according to another embodiment of the invention; and FIG. 5 shows a diagrammatic cross section of the vehicle from FIG. 4.

DESCRIPTION OF ILLUSTRATIVE EMBODIMENTS

Figure 1:
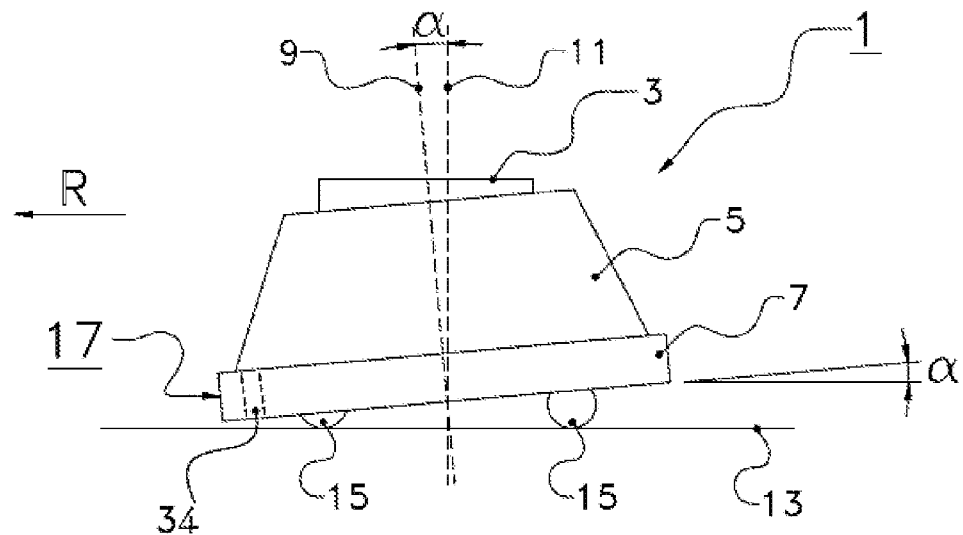
FIG. 1 shows a diagrammatic side view of a vehicle according to an embodiment of the invention.

The following is a description of certain embodiments of the invention, given by way of example only and with reference to the drawings. FIG. 1 shows a diagrammatic side view of a vehicle 1 according to an embodiment of the invention. The vehicle comprises a frame 3 and a housing 5 which is arranged on the frame 3, wherein the housing 5 comprises feed-displacement means 7 for displacing feed substantially laterally with respect to a direction of travel R. In an embodiment, the cylindrical part of the feed-displacement means is composed of one or more rectangular parts (34).

The outer periphery of the housing 5 forms the outer periphery of the vehicle 1.

The feed-displacement means 7 are situated in the bottom section of the housing 5 of the vehicle 1, are cylindrical and have a cylinder axis 9. The feed-displacement means 7 are rotatable with respect to the frame 3 about the cylinder axis 9 which is at an angle α to the vertical direction, illustrated here by the dash-dotted line 11. The feed-displacement means 7 are rotationally symmetrical about the cylinder axis 9.

The vehicle 1 is movable in the direction of travel R with respect to the ground 13 by means of wheels 15 which are attached to the frame 3. Due to the inclined position of the cylinder axis 9, a part 17 of the feed-displacement means which, viewed in the direction of travel, is situated at the front is arranged closer to the ground 13. As a result thereof, the vehicle is effectively able to laterally displace feed which is situated on the ground at the front of the vehicle without feed ending up under the vehicle. Preferably, the feed-displacement means are in contact with the ground 13 at the front in order to prevent feed from ending up under the vehicle and to ensure that as much feed as possible is displaced laterally. The contact with the ground can preferably also be used to drive the feed-displacement means by means of frictional contact with the ground. However, it is also possible to provide a separate drive for the feed-displacement means. The front wheel may be a non-driven wheel, such as a swivel wheel, or also, for example, a guide block or the like.

The section of the housing above the feed-displacement means is conical and tapers towards the top. An associated axis of symmetry of the cone shape coincides with the cylinder axis 9 and is therefore not indicated separately by a reference numeral. In this embodiment, only the cylindrical part of the housing rotates about the cylinder axis 9. In another embodiment, at least a part of the housing co-rotates with the feed-displacement means and thus forms part of the feed-displacement means.

Figure 2:
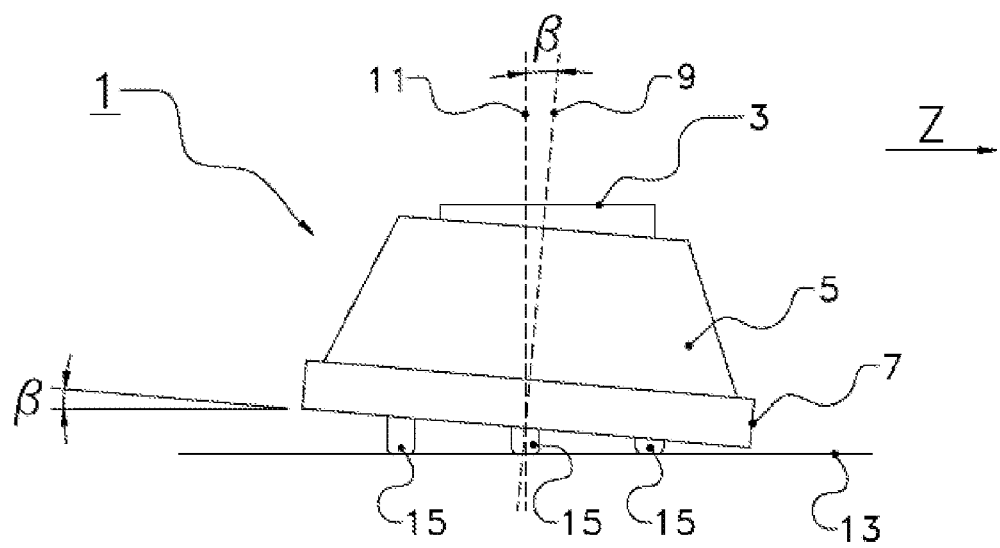
FIG. 2 shows a diagrammatic rear view of the vehicle from FIG. 1.

FIG. 2 shows the vehicle 1 from FIG. 1 in rear view. It can clearly be seen in this figure that the feed-displacement means 7 also make an angle β with the vertical direction in this view, as a result of which the feed-displacement means also lean over in the lateral direction Z. In other words: the plane defined by the vertical direction 11 and the cylinder axis 9 makes an angle with a plane defined by the vertical direction 11 and the direction of travel R. As a result thereof, it is simple to drive the feed-displacement means by means of frictional contact with the ground and to ensure that the feed-displacement means always rotate in the same direction when the vehicle moves in direction of travel R. It should be noted that the lowest point of the feed-displacement means is only at an outermost side if β does not equal zero, but α equals zero. In practice, both angles will often not be equal to zero, and so the lowest point is situated slightly obliquely at the front. However, the front point of the feed-displacement means will then, viewed in the direction of travel, always be lower than the rear point.

In an embodiment, a storage container or container can be arranged on top of vehicle 1 in order to store feed. The storage container is then preferably provided with a discharge device for dispensing feed in the direction of the ground. The discharge device comprises, for example, an opening which, viewed in the direction of travel, is situated at the front of the storage container in order to discharge the feed in the direction of a bottom section which is situated at the front of the vehicle. As a result thereof, the feed is mixed with the feed situated on the ground and is displaced laterally together with the latter.

Figure 3:
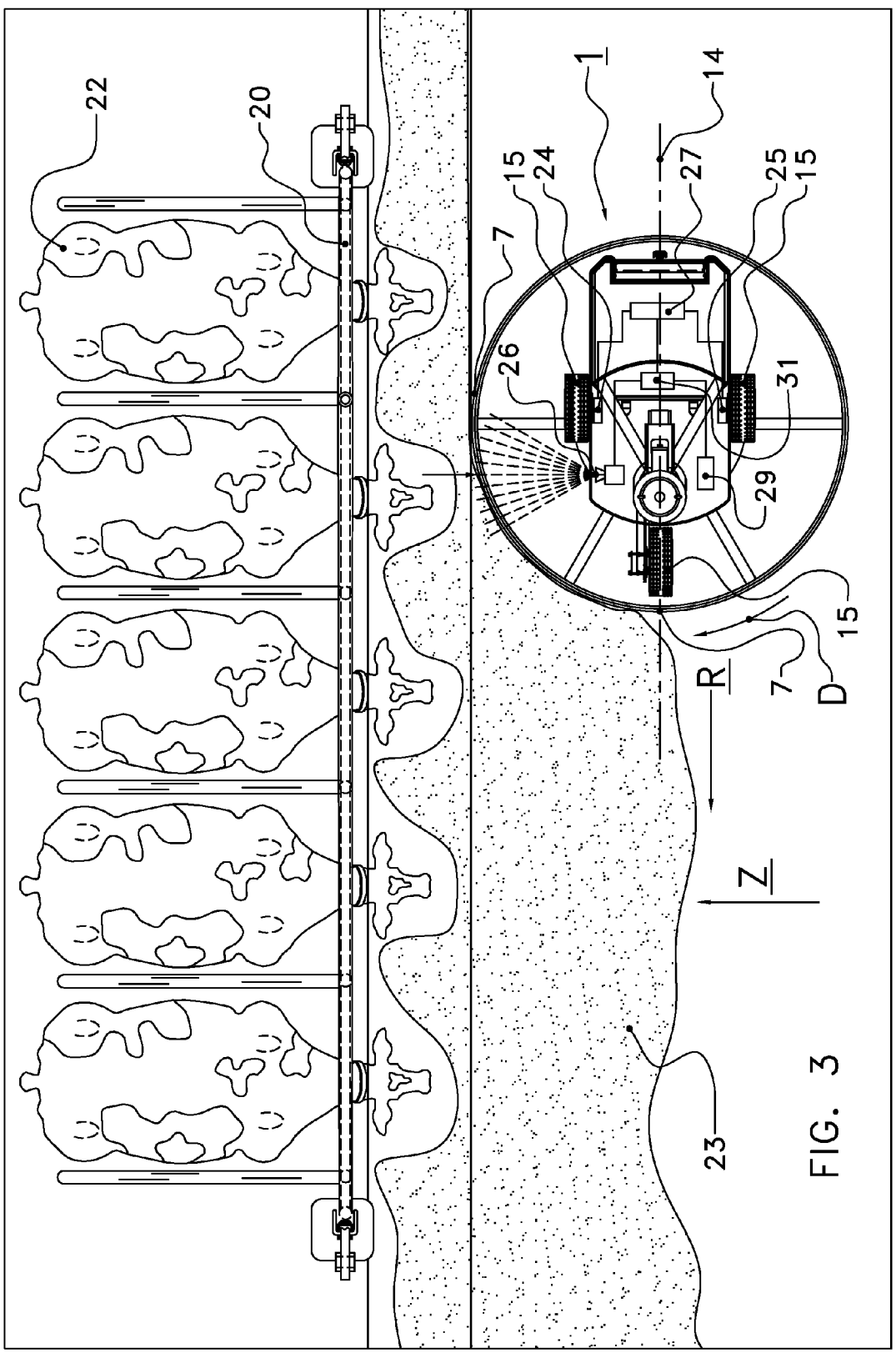
FIG. 3 shows a diagrammatic top view of a vehicle from FIGS. 1 and 2 in operation.

FIG. 3 shows a top view of a cut-away vehicle 1 according to FIGS. 1 and 2 in operation. A wall section or feeding fence 20 through which animals, in this case cows 22, can push their head through in order to be able to reach feed 23 is shown. As a result of eating, feed may end up out of reach of the cows. In order not to let this feed go to waste, it is therefore customary to bring the feed back within reach of the cows by means of pushing it on. This task is carried out by vehicle 1.

Vehicle 1 moves parallel with respect to the wall section 20 in a direction of travel R. During its movement, the feed-displacement means 7 make frictional contact with the ground, as a result of which it starts to rotate in direction D. As a result of this rotation, feed situated in front of the vehicle 1 is displaced in the lateral direction Z and is again brought within reach of the cows.

The vehicle 1 is driven by separate drive means 24, 25 which drive side wheels 15 separately. In this embodiment, the front wheel 15 cannot be driven. The front wheel 15 is freely rotatable about a substantially vertical direction in order to make it possible to take bends.

The vehicle 1 is furthermore provided with a distance-determining means 26 for determining the distance of the vehicle to the wall section 20. By means of a user input 29, a desired minimum distance can be input by a user. This minimum distance is compared to the distance measured by the distance-determining means 26 in unit 31, after which the control unit 27 ensures that the vehicle remains at a distance to the wall section during operation, which distance is greater than or equal to the preset minimum distance to the wall section and is determined by the distance-determining means. As a result thereof, the axis 14 remains parallel to the wall section when the vehicle is displaced in the direction of travel.

FIG. 4 shows a vehicle 1 for laterally displacing feed according to another embodiment of the invention. FIG. 5 shows the vehicle 1 from FIG. 4 in a cross section along line A-A.

Vehicle 1 comprises a frame 3 to the underside of which wheels 15 and a swivel wheel 16 are fitted. The frame 3 has a relatively heavy base unit 18 (see hatched section) which comprises all drive units and control units for the wheels, thus increasing the stability of the vehicle. The direction of travel of the vehicle is denoted by reference letter R. A housing 5 is supported by a stay 4 from the frame 3. The angle of the stay with respect to the vertical direction and thus the angle of the housing 5 can be adjusted.

The bottom section of the housing serves as a feed-displacement means 7. Both the conical part and the cylindrical part of the bottom section are rotationally symmetrical with respect to a cylinder axis 9. The feed-displacement means are rotatable about cylinder axis 9 and are driven by means of frictional contact with the ground at the front 17 of the vehicle, which is made possible by the position of the cylinder axis with respect to the vertical. It should be noted that FIG. 5 is only vertical due to the fact that the line A-A in FIG. 4 is at an angle according to the axis of rotation or cylinder axis 9.

At the bottom of the cylindrical part of the bottom section of the feed-displacement means 7, a rubber edge 8 can be seen which is also cylindrical.

When the vehicle 1 is driven in the direction of travel, the feed-displacement means 7 will rotate about the cylinder axis and in the process automatically displace feed which is situated in front of the vehicle in the lateral direction Z, due to frictional contact between, on the one hand, the ground or, if the feed-displacement means are slightly clear of the ground, feed situated on the ground, and, on the other hand, the rubber edge 8 at the lowest section.

The vehicle is provided with a bumper or shock-absorbing edge 30. This shock-absorbing edge not only protects the housing in the event of a possible collision, because the impact of the collision will in most cases be absorbed by the shock-absorbing edge and thus the upper section of the housing, but it may also contain a safety feature which, in case of collision, stops the drive of the wheels in order to prevent further damage or danger to animals, children and the like.

The remainder of the housing substantially tapers towards the top.

A container or storage container 31 is fitted on top of the vehicle. This can be used to store feed 23. This feed is carried along by the vehicle and can be dispensed as required by means of a discharge device, of which only a discharge opening 32 which can be closed with a sliding cover 33 is shown diagrammatically in FIG. 5. This discharge opening is situated at the front of the vehicle, viewed in the direction of travel. By means thereof, the discharge device can discharge feed in the direction of the section of the ground which is situated in front of the vehicle. The feed can then be mixed with the feed which is situated in front of the vehicle and then be displaced laterally together with the latter. Since such a vehicle could become slightly top-heavy, due to the high position of, on the one hand, the storage container and, on the other hand, the feed, as large as possible a wheel base and stability is very advantageous.

Further modifications in addition to those described above may be made to the structures and techniques described herein without departing from the spirit and scope of the invention. Accordingly, although specific embodiments have been described, these are examples only and are not limiting upon the scope of the invention.

What is claimed is:

1. An autonomous and self-propelled vehicle for substantially laterally displacing feed situated on a ground, comprising:
   a frame;
   a housing arranged on the frame, wherein the housing comprises feed-displacement device for displacing feed substantially laterally with respect to a direction of travel, wherein the feed-displacement device is rotatable with respect to the frame, and wherein the outer periphery of the housing forms the outer periphery of the vehicle;
   wherein at least a bottom section of the feed-displacement device has a cylindrical shape having a cylinder axis, wherein the feed-displacement device is rotationally symmetrical about the cylinder axis, wherein the feed-displacement device is rotatable about the cylinder axis, and wherein the cylinder axis is at an angle to a vertical direction in such a manner that a part of the feed-displacement device which, viewed in the direction of travel, is situated at the front is arranged closer to the floor than a part of the feed-displacement device which, viewed in the direction of travel, is situated at the rear,
   wherein the housing has an upper section which tapers towards the top, and wherein the upper section is conical.

2. A vehicle according to claim 1, wherein the housing is rotationally symmetrical.

3. A vehicle according to claim 1, wherein at least a bottom edge of the bottom section of the feed-displacement device is made of rubber.

4. A vehicle according to claim 1, wherein the cylindrical part of the feed-displacement device is composed of one or more rectangular parts.

5. A vehicle according to claim 1, wherein the angle between the cylinder axis and the vertical direction is adjustable.

6. A vehicle according to claim 1, wherein the angle between the cylinder axis and the vertical direction is between 1 and 10 degrees.

7. A vehicle according to claim 1, wherein an angle between a vertical projection of the cylinder axis and the direction of travel is unequal to zero.

8. A vehicle according to claim 1, wherein the feed-displacement device is arranged freely rotatably for frictional drive with the ground and/or the feed.

9. A vehicle according to claim 1, which is provided with:
   two wheels which can be driven separately by separate driving devices;
   a distance-determining device for determining the distance of the vehicle to a wall section;

a control unit for controlling and displacing the vehicle in the direction of travel;

wherein the control unit is programmed in such a way that the vehicle, during operation, remains at a distance to the wall section which is determined by the distance-determining device, which distance is greater than or equal to a preset minimum distance to the wall section.

10. A vehicle according to claim 1, wherein the vehicle is provided with a rechargeable power supply.

11. A vehicle according to claim 1, wherein the vehicle is provided with a storage container for containing feed, and with a discharge device for discharging feed in the direction of the ground.

12. A vehicle according to claim 11, wherein the discharge device is designed to discharge the feed in the direction of the ground section situated in front of the vehicle, preferably by means of a dispensing opening which is, viewed in the direction of travel, situated at the front.

* * * * *